April 14, 1970     W. J. DENKOWSKI     3,505,888

ROTARY AND LINEAR DUAL MOTION VALVE OPERATOR

Filed Oct. 10, 1968     4 Sheets-Sheet 1

INVENTOR.
Walter J. Denkowski
BY
Paul + Paul
ATTORNEYS.

INVENTOR.
Walter J. Denkowski

BY

Paul + Paul
ATTORNEYS.

April 14, 1970   W. J. DENKOWSKI   3,505,888
ROTARY AND LINEAR DUAL MOTION VALVE OPERATOR
Filed Oct. 10, 1968   4 Sheets-Sheet 3

INVENTOR.
Walter J. Denkowski
BY
Paul + Paul
ATTORNEYS.

INVENTOR.
Walter J. Denkowski

United States Patent Office 3,505,888
Patented Apr. 14, 1970

3,505,888
ROTARY AND LINEAR DUAL MOTION
VALVE OPERATOR
Walter J. Denkowski, King of Prussia, Pa., assignor to King of Prussia Research and Development Corporation, King of Prussia, Pa., a corporation of Pennsylvania
Filed Oct. 10, 1968, Ser. No. 766,518
Int. Cl. F16h 25/00; F16d 3/24; F16k 31/02
U.S. Cl. 74—89.15                                    15 Claims

ABSTRACT OF THE DISCLOSURE

A valve operator is disclosed which in a typical application is used to control an alumina slurry valve. In normal operation, the alumina slurry valve operator raises and lowers the valve stem (to open and close the valve) by driving a nut rotationally while the stem is locked against rotation. The locking means includes a sleeve keyed to the stem and coupled through gears to a no-back drive. Torque sensing means sense that the valve seat of the alumina slurry valve should be scraped and cleaned. Clutch means are then engaged to utilize the no-back drive to drive the gear train to rotate the stem in the same direction and at the same time as the nut but at a slightly slower speed of rotation, thereby to move the rotating stem very slowly in the downward direction, thereby to scrape and clean the valve seat. In some cases, it will be preferable to utilize the no-back drive to drive the gear train to rotate the stem in the same direction and at the same time and at the same speed as the nut, thereby to rotate the stem to scrape the valve seat but without moving the stem downwardly.

FIELD OF THE INVENTION

This invention relates to valve operators, and particularly to operators which move a normally non-rotating stem up and down to open and close a valve.

BACKGROUND OF THE INVENTION

Alumina slurry (and other slurries or fluids of similar characteristics) tend to accumulate deposits on the valve seats, and unless these deposits are scraped and cleaned, it becomes very difficult, if not impossible, to close the valve tightly.

SUMMARY OF THE INVENTION

An important object of the present invention is to provide, in an otherwise conventional type of valve operator for raising and lowering a nonrotating stem to open and close the valve, means which on command rotate the stem to scrape and clean the valve seat.

A more detailed object of the present invention is to modify an otherwise conventional type of valve operator, which raises and lowers an externally-threaded nonrotating valve stem, to include means which, in response to the closing of a switch or the like, will rotate the valve stem to scrape and clean the valve seat. In some cases, the stem, during the valve-seat cleaning operation, is merely rotated. In other cases, the stem is moved slowly downward while being rotated.

The foregoing objects are accomplished, in accordance with a preferred form of the present invention, by the provision of a normally-rotating first set of gears which are connected through a normally-disengaged clutch to the input member of a no-back drive and a second set of gears which connect a sleeve which is keyed to the valve stem to the output member of the no-back drive. By the latter means, the valve stem, in normal operation, is locked against rotation. When the operator wants to scrape the valve seat, he closes a switch or the like to engage the normally-disengaged clutch to couple the normally-rotating first set of gears to the input member of the no-back drive to drive the output member and the second set of gears. The gear ratios of the two sets of gears are so selected that the stem is driven rotationally in the same direction and at the same time as the main drive nut but at a speed either equal to or very slightly slower than the rotational speed of the main drive nut, thereby either to merely rotate the stem without any axial movement either downward or upward, or to move the rotating stem axially downwardly very slowly, thereby in either case to scrape and clean the valve seat.

DESRIPTION OF THE PREFERRED EMBODIMENTS

Figure 1:
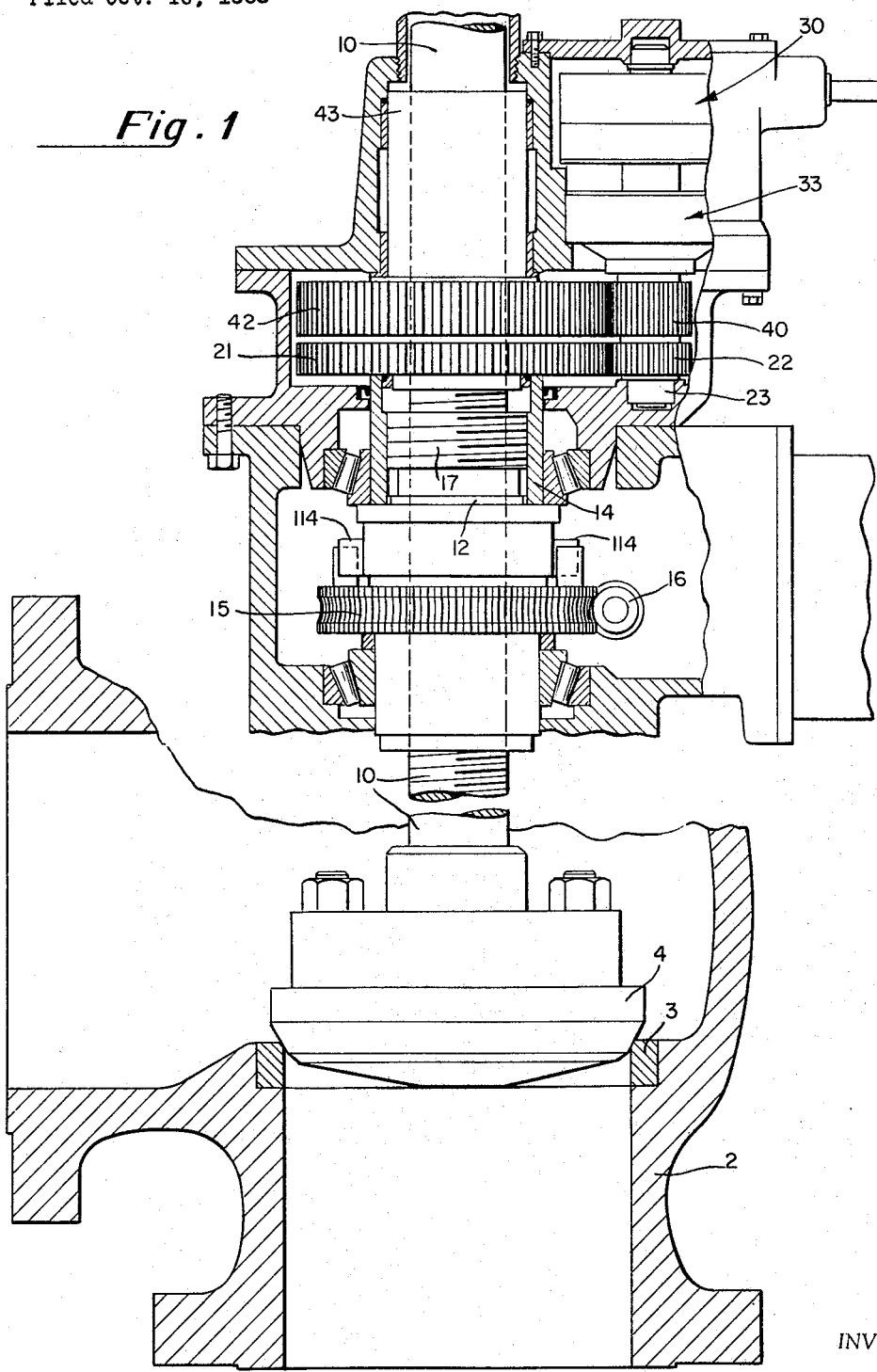
FIG. 1 is an elevational view, partly in section, showing a valve and a valve operator having incorporated therein one embodiment of the present invention.
Figure 2:
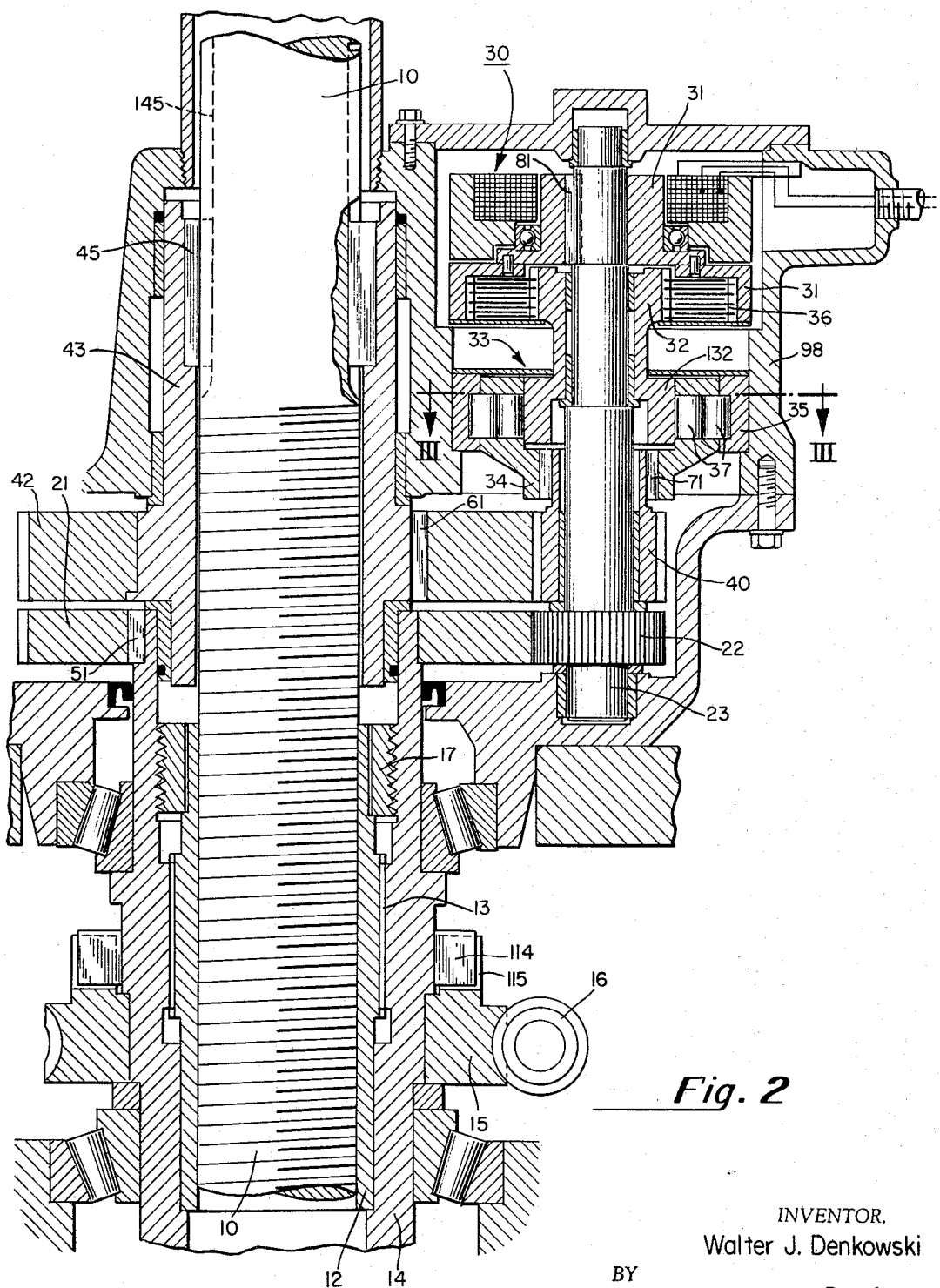
FIG. 2 is an enlarged view, in section, of the valve operator of FIG. 1.

There is shown in FIG. 1, a valve body 2, having a valve seat 3, and a valve-closing element 4 secured to the lower end of an externally-threaded valve stem 10 which is normally driven up and down in the direction of its longitudinal axis, without rotation of the stem, by a drive worm 16, worm gear 15, sleeve 14 and nut 12, as seen more clearly in FIG. 2. The nut 12 is keyed, as by key 13, to the drive sleeve 14. The drive sleeve 14 has a pair of opposed radially extending lugs 114 spaced 180° apart. The worm gear 15, has a pair of upstanding lugs 115 spaced 180° apart. When worm gear 15 is rotated by the drive worm 16, the lugs 115 engage, in lug-on-lug engagement, the lugs 114 of the sleeve 14. Thus, drive sleeve 14 is driven by the worm gear 15.

During normal operation, the stem 10 is locked against rotation, by the no-back drive means later to be described, and accordingly rotation of the drive nut 12 (which is held against movement in the direction of the stem axis as by jam nut 17 in the drive sleeve 14) causes the stem to move axially. In this manner, the valve-closing element 4 is raised and lowered relative to the valve seat 3.

In accordance with the present invention, stem 10, during normal operation, is locked against rotation by a key 45 which is fitted into a keyway 145 in the stem 10. Key 45 is keyed into sleeve 43 which is secured, as by key 61, to a gear 42 which is in mesh with a pinion 40 mounted for free rotation on the shaft 23. Pinion 40 is keyed, as by key 71, to the output member 34 of the no-back drive 33, so that unless the no-back drive is driven from the input end, the no-back drive prevents rotation of member 34, and as this prevents rotation of pinion 40 and gear 42, rotation of sleeve 43 and stem 10 is prevented. This is the situation during normal operation.

Also, in accordance with the present invention, the drive sleeve 14 is keyed, as by key 51, to a gear 21 located on said drive sleeve, and gear 21 is in mesh with a gear 22 mounted on and keyed to shaft 23. During operation, shaft 23 is always rotating.

In summary, in normal operation, as is well understood, the stem 10 of FIGS. 1 and 2 is raised and lowered by the rotation of nut 12, the nut 12 being held fixed against axial movement. The stem 10, as just described, is held fixed against rotation by key 45 of sleeve 43, rotation of the sleeve 43 being prevented by the reverse locking clutch or no-back drive 33.

Assume that the valve operator automatically shuts off in response to a signal that is generated by a well known form of torque-responsive equipment in response to an increase in torque experienced in attempting to close the valve when the valve seat has accumulated thereon deposits sufficient to warrant a cleaning operation. To scrape and clean the valve seat 3, using the form of valve operator shown in FIGS. 1 and 2, the operator merely closes a switch (not shown) to energize a magnetic clutch 30. Member 31 of clutch 30 is keyed by key 81 to the shaft 23, and shaft 23, as previously described, is fixed to gear 22 and as a result always rotates whenever the drive nut 12 is rotated. Thus, member 31 of the magnetic clutch is always rotating. The plates 36 of the magnetic clutch 30 are, however, normally not engaged, and thus the output member 32 of the magnetic clutch 30 is normally stationary. However, when the magnetic clutch 30 is energized, as by the switch means referred to above, the plates 36 are brought into frictional engagement with each other, and the output member 32 of the magnetic clutch 30 is driven rotationally.

Output member 32 of the magnetic clutch 30 has an integral lower or depending portion, identified as 132, which functions as the input member to the no-back drive device 33. Details of the operation of the no-back drive of FIGS. 1 and 2 will be given later. For the moment, it will be sufficient to point out that when the input member 132 of the no-back drive 33 is driven rotationally, the output member 34 is also driven rotationally by the clutching rollers 37. Since output member 34 is keyed by key 71 to the gear 40 which is mounted for free rotation on shaft 23, and since gear 40 is in mesh with gear 42, gear 42 is driven rotationally. And, since gear 42 is keyed by key 61 to sleeve 43 and sleeve 43 is keyed by key 45 to the stem 10, the stem 10 is driven rotationally.

In summary, when magnetic clutch 30 is energized, the stem 10 is driven rotationally by the worm drive 16 through a path which may be traced from worm 16 to stem 10 as follows: Worm 16, gear 15, drive sleeve 14, gear 21, gear 22, shaft 23, magnetic clutch members 31, 36, 32, no-back drive or reverse locking clutch members 132, 37 and 34, gear 40, gear 42 and sleeve 43. During this same time, nut 12 is rotating with the stem 10.

In accordance with the concept of the present invention, the two sets of gears 21–22 and 42–40, are so designed relative to each other, that when these gears are driven by the means just described, the stem 10 is rotated in the same direction of rotation as the nut 12, either at the same speed or at a speed just slightly slower than the speed of rotation of the nut 12. As a result, the stem 10 is either rotated without any downward movement, or is rotated while being driven very slowly in the downward axial direction, in either case scraping and cleaning the valve seat.

Referring again to the gear sets 21–22 and 40–42, the following is an example of one suitable design for rotating the stem while driving it very slowly downward: Each of the gears 22 and 40 on shaft 23 have 28 teeth. Of the gears on stem 10, gear 42 has one more tooth than gear 21. For example, gear 42 has 117 teeth while 21 has only 116 teeth. Thus, in the cleaning phase, gear 21 is rotating at exactly the same rotational speed as nut 12, and gear 40 is rotating at exactly the same speed as gear 22, but gear 42 is rotating at a slightly slower speed than gear 21. Thus, the stem 10 is rotated at a speed just slightly slower than the drive nut 12. The result, as previously stated, is to move the stem 10 very slowly in the downward direction toward the valve seat 3. If no downward movement of stem 10 is desired, gears 42 and 21 will have a 1:1 gear ratio.

While the reverse-locking clutch 33 illustrated in FIGS. 1 and 2 represent a new and presently preferred form of no-back drive, other no-back drive means may be used to accomplish the same or similar result. One form of such other means is illustrated in FIGS. 6 and 7.

Figure 6:
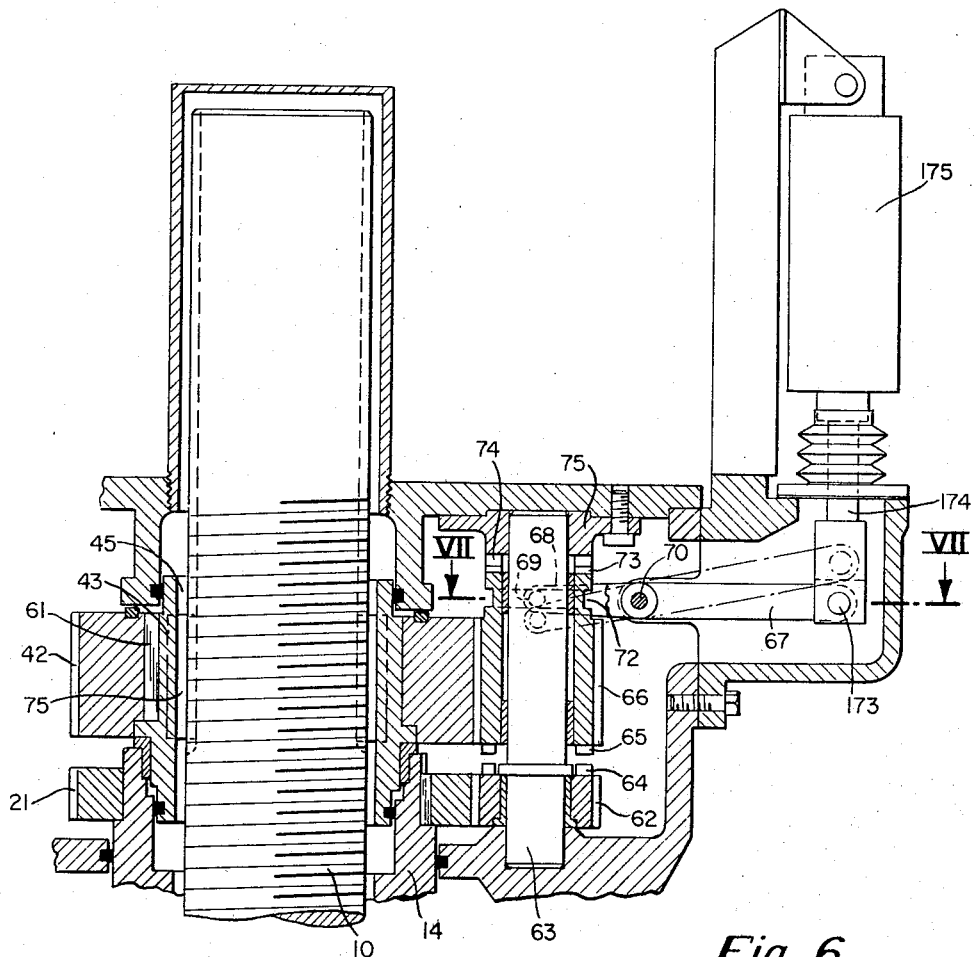
FIG. 6 is an elevational view, in section, showing another form of clutch suitable for use in the present invention.
Figure 7:
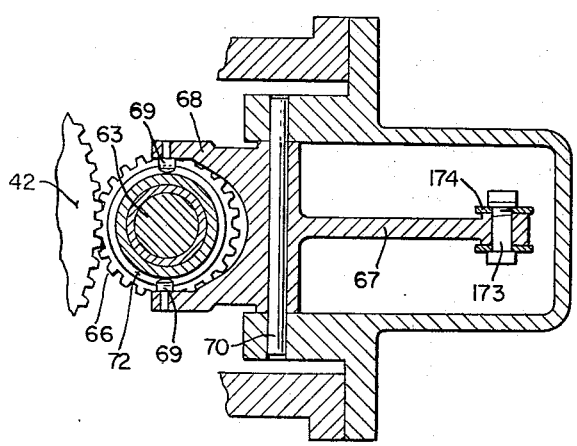
FIG. 7 is a view looking down along the line VII—VII of FIG. 6.

In FIGS. 6 and 7, parts which are similar to those of FIGS. 1 and 2 are identified by the same reference numerals. In FIGS. 6 and 7, drive sleeve 14 may be assumed to be driven by worm 16 and worm gear 15 as in FIGS. 1 and 2. Sleeve 14 drives gear 21 which is in mesh with and drives gear 62 on shaft 63. Gear 62 is mounted for free rotation on shaft 63 and hence shaft 63 is stationary.

Gear 62 is equipped with a pair of 180° spaced-apart upstanding lugs 64 which, during normal operation, rotate in a circular path located below a pair of depending lugs 65 which project down from a gear 66 mounted free on shaft 63. Gear 66 is movable up and down relative to shaft 63, but is normally held in raised position by a lever arm 67. Thus, the normally rotating lugs 64 are normally clear and not in engagement with the lugs 65.

The means by which the gear 66 is held in the raised position illustrated in FIG. 6 are more clearly seen in FIG. 7. A generally horizontally disposed lever 67 is mounted for pivotal movement on a cross shaft 70 which is supported in the housing. At the left end of lever 67 is a yoke 68 having a pair of opposed inwardly directed pins 69 which are received within an annular recess 72 provided in the upper circumferential surface of the gear 66. The right end of the lever 67 is pivotally secured by a pivot pin 173 to the vertically disposed piston 174 of a cylinder 175 supported by the housing on the valve operator.

As seen in FIG. 6, when the piston 174 is extended downward, which is its normal position, the lever 67 occupies a generally level horizontal position, and the yoke end 68 of the lever arm holds the gear 66 in its upper or raised position, and the lugs 65 are clear of the rotating lugs 64 of the gear 62.

To provide the desired no-back drive feature, rotation of gear 66 is prevented when in normal raised position, by providing the upper end of the gear 66 with a pair of upwardly projecting lugs 73 located at 180° spacing which engage, in lug-on-lug engagement, a pair of lugs 74 spaced 180° apart and which project downwardly from a hub plate 75 fixed to the under surface of the frame of the housing.

In FIGS. 6 and 7, gear 66 meshes with a gear 42 which is keyed to a sleeve 43 which in turn is keyed into a keyway in the stem 10. Thus, gear 42 and sleeve 43 are similar to parts bearing the same reference numerals in FIGS. 1 and 2.

During normal operation, rotation of stem 10 is prevented since gear 66 is locked by lugs 74 and 73 against rotation and thus gear 42 cannot rotate. Thus, stem 10 of FIGS. 6 and 7, during normal operation, is driven up and down, without rotation of the stem, by rotation of the drive nut. This action is similar to that of FIGS. 1 and 2.

When, through a torque responsive signal or otherwise, it is determined that the valve seat should be scraped, the operator operates the compressed air or hydraulic supply (not shown) to retract piston 174 into the cylinder 175. Lever 67 pivots about shaft 70 and yoke end 68 pushes the gear 66 downwardly on the shaft 63. Gear 62 remains fixed axially, but is, of course, rotating. The downwardly projecting lugs 65 of gear 66 engage the upwardly projecting lugs 64 of the rotating gear 62, after the upwardly projecting lugs 73 at the upper end of gear 66 disengage from the lugs 74 of hub plate 75. Gear 66 now rotates. Rotating gear 66 now drives gear 42, which is keyed to sleeve 43, which in turn is keyed to stem 10. In this way, stem 10 is driven rotationally in the seat cleaning phase.

As in FIGS. 1 and 2, the gear ratios of the gear sets 21–62 and 42–66 of FIG. 6 are so selected that gear 21 is driven at the same rotational speed as nut 12, and gear 42 is driven at the same or at slightly slower speed. The number of teeth on the respective gears 21, 62, 42 and 66 may, in fact, be the same as for the corresponding gears in FIG. 2, with gears 62 and 66 having equal number of teeth, and with gear 42 having either the same number or one more tooth than gear 21.

Two forms of reverse-locking clutch or no-back drive have been shown and described. Modifications to these forms may be made without departing from the invention claimed herein. For example, the air cylinder 175 in FIG. 6, instead of being offset from the axis of shaft 63, may be mounted directly above and in alignment with the axis of shaft 63. In that case, shaft 63 will be connected directly to the piston 174 of the air or hydraulic cylinder 175, and will move up and down. Gear 66, while mounted for free rotation on shaft 63, will be held in fixed axial relation to the shaft 63, as by snap rings at each end of the gear, whereby extension and retraction of the piston 174 will move the shaft 63 and gear 66 together axially.

Instead of using the magnetic clutch 30 to control the novel type of no-back drive shown in FIG. 2 (the details of which will be described below) the magnetic clutch 30 could be used to control a known form of reverse-locking clutch, one such form being known as a Form-Lock Over-Running Clutch, a product of Form Sprag Co.

Figure 3:
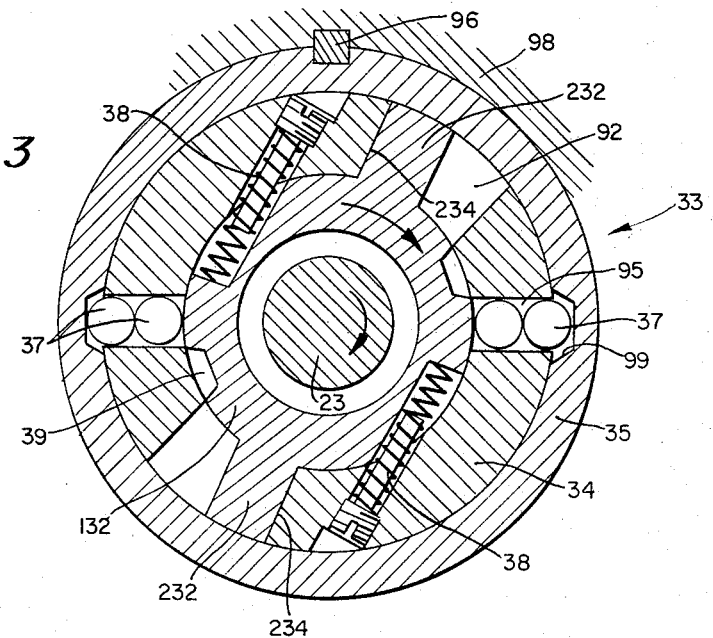
FIG. 3 is a sectional view looking down along the line III—III of FIG. 2, showing a presently preferred form of reverse locking clutch in no-back drive position.
Figure 5:
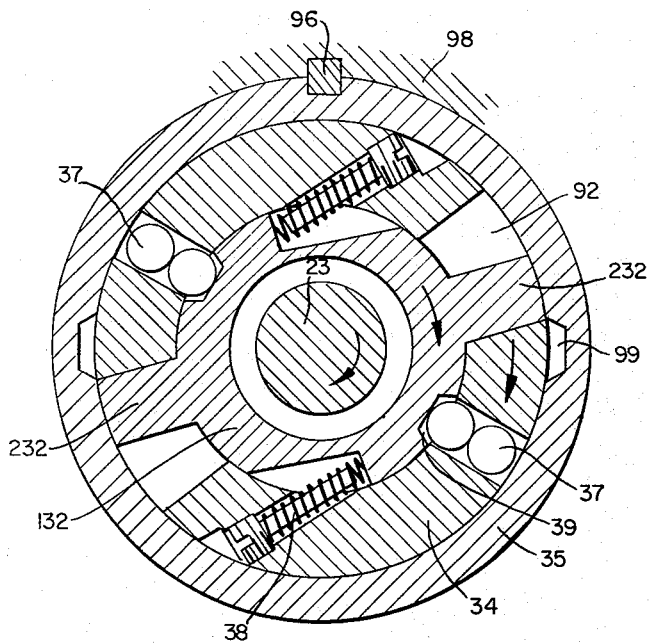
FIG. 5 is a sectional view of the no-back drive clutch of FIG. 3 showing the device in drive condition.
Figure 4:
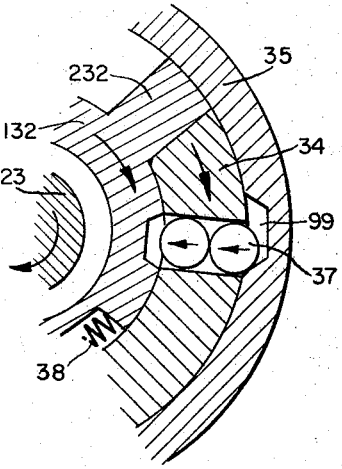
FIG. 4 is a fragmentary view of the no-back drive clutch of FIG. 3 showing the clutch moving toward drive condition.

The particular form of no-back drive shown in FIG. 2 is novel and the details thereof are shown in FIGS. 3–5. Surrounding shaft 23, for free rotation relative thereto, is an input member 132 which is the lower integral portion of the output member 32 of magnetic clutch 30. When not being driven rotationally by the magnetic clutch, the lugs 232 of the input member 132 are spring loaded by spring 38, against sides 234 of output drive sleeve 34, to the angular position shown in FIG. 3. When member 132 is in this position, the two opposed recesses 39 are facing solid portions of the slotted upper portion of output member 34.

The upper portion of output member 34 is provided with a first pair of opposed slots 92 for receiving the radially projecting lugs 232 of the input member 132. Output member 34 is also provided with a second pair of opposed slots 95, each of which has therein a pair of rollers 37. The sum of the diameters of the two rollers of each pair of rollers is greater than the length of the slot 95 so that a portion of one roller or the other must project radially beyond the member 34, the projecting portion being either radially outward as in FIG. 3, or radially inward as in FIG. 5. An outer ring member 35, fixed against rotation in the housing member 98, as by key 96, is provided on its interior surface with a pair of oppositely disposed recesses 99, which, during normal operation, receive the projecting portion of the outer roller, thereby preventing rotation of output member 34.

It will be seen then that during normal operation, with the component parts of the no-back drive positioned as in FIG. 3, the output shaft 34 cannot be rotated in either direction by torque forces applied thereto by gear 40. Thus, so long as the input member 132 of the no-back drive remains in its loaded or biased position, the no-back drive prevents rotation of the stem 10 in either direction in response to any torque forces which may be applied to the stem.

Consider now what happens when the magnetic clutch 30 is energized. Since shaft 23 is rotating, input member 132 of the no-back drive is now driven. It will be assumed that when input member 132 is driven clockwise, as viewed in FIG. 3, the nut 12 is being driven in a direction to move stem 10 downwardly to close the valve. When member 132 moves clockwise, its radially projecting lugs 232, upon reaching the edge of the slot 92, engage the output member 34, as indicated in FIG. 4.

When this occurs, the recesses 39 of the input member have come into radial alignment with the slots 95 containing the rollers 37, and also in alignment with the recesses 99 in the fixed ring 35. Due to the inclined slope of the side walls of the recesses 99, a reaction force is applied against the rollers 37 which tends to move the rollers radially inward, as indicated in FIG. 4, and since recesses 39 are now aligned with slots 95, the rollers 37 move radially inward. This releases the locking engagement with ring 35 and allows output member 34 to be moved clockwise by the input member 132, as indicated in FIG. 5, and thereafter output member 34 continues to be rotated along with input member 132, during the valve-seat grinding operation.

The particular no-back drive 33 illustrated and just described, is a one-way device in that output member 34 is capable of being driven by rotation of input member 132 in one direction only—clockwise in the illustrated embodiment.

The above is not a disadvantage insofar as the alumina slurry valve is concerned, since grinding of the valve requires one-direction rotation only of the stem. It is to be noted, moreover, that the reverse-locking feature of the no-back drive 33 is two-way. That is to say, the output member 34 is locked against rotation in either direction from torque forces impressed thereon from the load stem.

The particular reverse-locking clutch or no-back drive 33 illustrated and described herein has some loss motion or back-lash, but this is not important to the use of the clutch described herein. The advantages of the new clutch 33 include the fact that it requires very little torque to unlock the no-back drive, in comparison with the locking force involved.

Hereinabove, in describing the form of grinding or cleaning operation of the valve seat, in which the stem is moved slowly toward the valve seat, it was pointed out that the gear set 21–22 of FIG. 1 (or 21–62 of FIG. 6) which connects the drive input to the input member of the reverse-locking clutch 33 has a gear ratio similar to but slightly different from that of the gear set 42–40 of FIG. 1 (or 42–66 of FIG. 6). While the corresponding gears of the two gear sets are of equal diameters, and while the number of teeth on one pair of corresponding gears are equal, the number of teeth on the other pair of corresponding gears are unequal but only by a small difference. For example, the small gears may have the same number of teeth but the large gear 42 of the second set may have one more tooth than the large gear 21 of the first set. While this is the preferred arrangement, so far as the broad concept of the invention is concerned, the difference in gear ratio may be accomplished by giving one of the smaller gears a different number of teeth than the other of the smaller gears, with the larger gears of the respective sets having the same number of gears.

It was indicated previously herein that the need for grinding the valve seat may be signalled by a shutting off of the motor drive circuit of the valve operator in response to excessive torque forces developed when the valve operator attempts to close the valve. The torque sensitive device for shutting off the valve operator may be a torque limit switch of the type shown in U.S. Patent 2,114,013, granted Apr. 12, 1938, to Russell C. Ball.

What is claimed is:
1. A valve operator having:
 (a) a housing,
 (b) an externally-threaded stem supported in said housing,
 (c) a nut threaded on said stem but held in said housing against axial movement,
 (d) drive means for rotating said nut,
 (e) a no-back drive having input and output members,
 (f) means for holding said stem against rotation during rotation of said nut, thereby to move said stem axially relative to said nut,
 (g) said holding means including means coupling said stem to the output member of said no-back drive,
- (h) means, including a normally disengaged clutch, coupling said drive means to the input member of said no-back drive, and
- (i) control means for engaging said clutch to connect said drive means to the input member of said no-back drive, thereby to drive said output member, and thereby to drive said stem rotationally concurrently with the rotation of said nut.

2. A valve operator according to claim 1 characterized in that
- (a) the means coupling said drive means to said input member of said no-back drive includes a first gear set having one gear mounted coaxially with said stem,
- (b) the means coupling said stem to the output member of said no-back drive includes a second gear set having one gear mounted coaxially with said stem,
- (c) the gear ratios of said first and second gear sets being equal or substantially equal.

3. A valve operator according to claim 2 characterized in that
- (a) the diameters of corresponding gears of the two gear sets are equal,
- (b) the number of teeth on two of the corresponding gears are equal,
- (c) the number of teeth on two other corresponding gears are unequal by a small difference.

4. A valve operator according to claim 3 characterized in that the number of teeth on one of said two other corresponding gears is different by one than the number of teeth on the other of said two other corresponding gears.

5. A valve operator according to claim 4 further characterized in that
- (a) each gear set has one large diameter and one small diameter gear,
- (b) the larger diameter gear of each set is coaxial with said stem,
- (c) the number of teeth on the larger gear of the second set is greater by one than the number of teeth on the larger gear of the first set.

6. A valve operator according to claim 5 characterized in that
- (a) a separate auxiliary shaft is provided on which the smaller diameter gears of both gear sets are mounted coaxially at displaced axial positions.

7. A valve operator according to claim 6 characterized in that
- (a) said input and output members of said no-back drive are mounted concentrically on said auxiliary shaft, said input member being within said output member,
- (b) said output member is disposed within a ring member fixed in said housing,
- (c) said output member has a plurality of radial slots extending therethrough,
- (d) a plurality of roller clutching elements are within each of said slots,
- (e) the sum of the diameters of said roller clutching elements exceed the length of the slot, whereby a portion of one of the roller elements projects beyond the output member in either an inward or outward radial direction,
- (f) a plurality of camming recesses are provided at spaced locations in the interior surface of said fixed ring member,
- (g) a plurality of camming recesses are provided at spaced locations in the outer surface of said input member,
- (h) said input member contains a plurality of lugs extending radially outward for engaging said output member when said input member is driven rotationally,
- (i) spring-loaded means normally bias said input member in such angular position relative to said output member that said camming recesses in the exterior surface of said input member are out of alignment with the slots in said output member.

8. A valve operator having:
- (a) a housing,
- (b) an externally-threaded stem supported in said housing,
- (c) a nut threaded on said stem but held in said housing against axial movement,
- (d) drive means for rotating said nut,
- (e) a reverse-locking clutch having input and output members,
- (f) means coupling said output member of said clutch to said stem,
- (g) means normally holding said output member of said clutch against rotation,
- (h) means coupling said drive means to the input member of said clutch, and
- (i) control means for releasing said output member of said clutch from said holding means and for connecting said output member to said input member, thereby to drive said output member rotationally.

9. A valve operator having:
- (a) a housing,
- (b) an externally-threaded stem supported in said housing,
- (c) a nut threaded on said stem but held in said housing against axial movement,
- (d) drive means for rotating said nut,
- (e) a reverse-locking clutch having input and output members,
- (f) means coupling said stem to the output member of said clutch,
- (g) means normally holding said output member of said clutch against rotation during rotation of said nut,
- (h) means for coupling said drive means to the input member of said clutch, and
- (i) means for disengaging said holding means from said output member and for coupling said output and input members, thereby to allow said input member to drive said output member, and thereby to drive said stem rotationally concurrently with the rotation of said nut.

10. A valve operator according to claim 9 characterized in that said means for coupling said drive means to the input member of said reverse-locking clutch includes a second clutch.

11. A valve operator having:
- (a) a housing,
- (b) an externally-threaded stem supported in said housing,
- (c) a nut threaded on said stem and held in said housing against axial movement,
- (d) drive means for rotating said nut,
- (e) a first gear set connected to and driven by said drive means,
- (f) a second gear set having one gear mounted coaxially on said stem,
- (g) means securing said one gear of said second set to said stem,
- (h) a reverse-locking clutch coupled between said first and second gear sets, said reverse-locking clutch normally holding said second gear set against rotation, and
- (i) control means for releasing said reverse-locking clutch to intercouple said first and second gear sets for driving said second gear set from said first gear set.

12. A valve operator according to claim 11 characterized in that
- (a) corresponding gears of said first and second gear sets are of equal diameter, (b) one pair of corresponding gears of said first and second gear sets have the same number of teeth, (c) the other corresponding gears of the first and second gear sets having an unequal number of teeth, the difference therebetween being small.

13. A valve operator according to claim 12 characterized in that (a) each of said first and second gear sets includes a large diameter gear and a small diameter gear, (b) the number of teeth on the small diameter gears are equal, (c) one of the larger gears has one more tooth than the other large gear.

14. A valve operator according to claim 11 characterized in that (a) corresponding gears of said first and second gear sets are of equal diameter and have the same number of teeth.

15. A valve operator according to claim 12 characterized in that (a) each of said first and second gear sets includes a large diameter gear and a small diameter gear.

References Cited

UNITED STATES PATENTS

| | | | |
|---|---|---|---|
| 1,908,763 | 5/1933 | Kelty | 251—81 |
| 2,496,740 | 2/1950 | Morey | 74—424.8 |
| 2,855,940 | 10/1958 | Milleville et al. | 74—625 |
| 3,305,057 | 2/1967 | McAlpin et al. | 192—38 |
| 3,377,878 | 4/1968 | Maroth | 74—89.15 |

MILTON KAUFMAN, Primary Examiner

W. S. RATLIFF, JR., Assistant Examiner

U.S. Cl. X.R.

192—38; 251—133